April 11, 1950 B. B. LE MAY 2,503,497
TRANSMISSION
Filed July 18, 1947
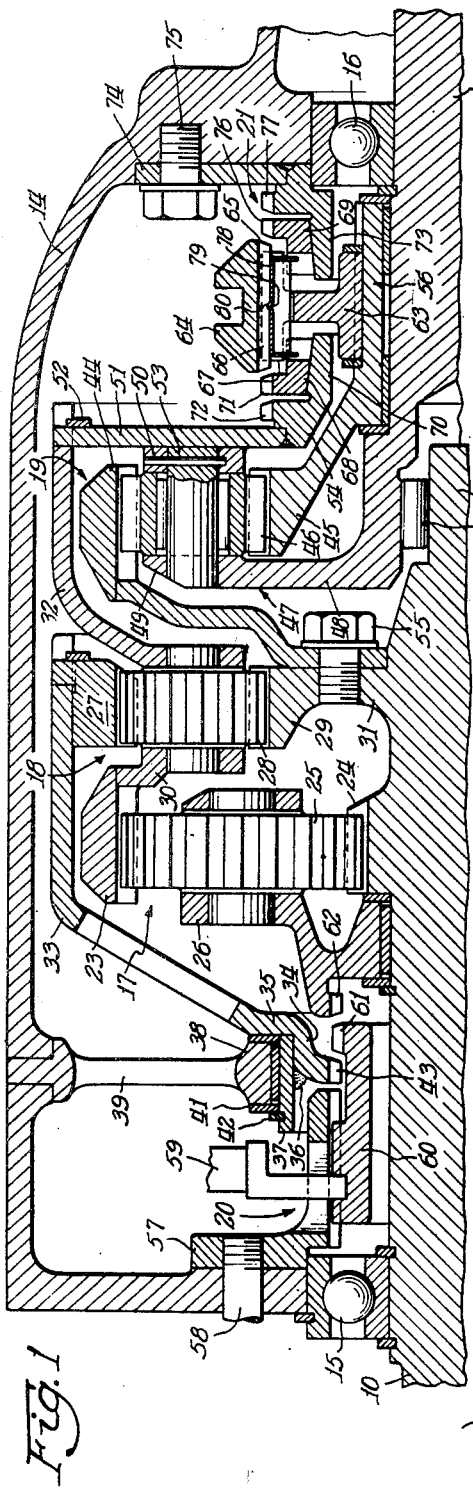
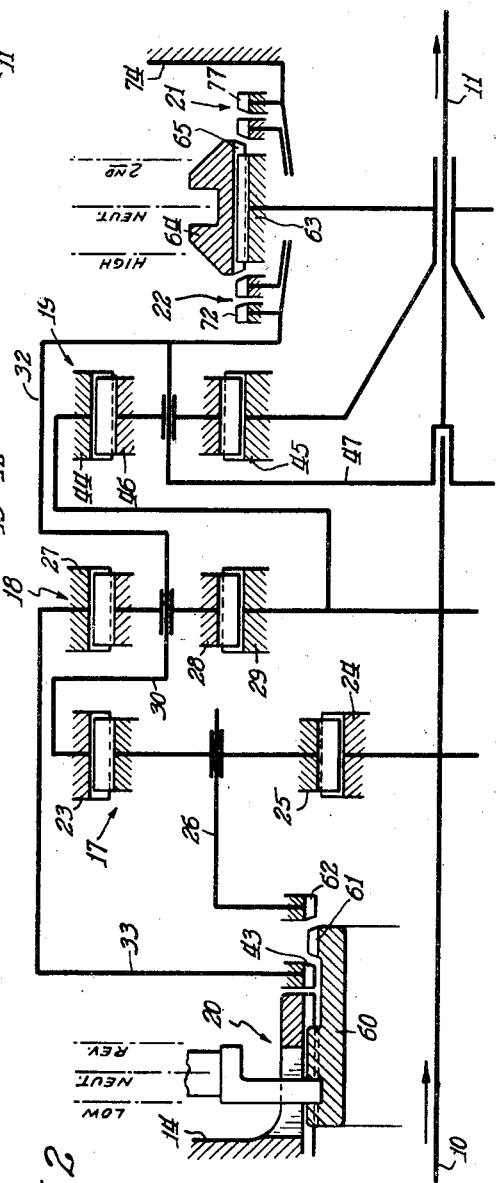
Inventor:
Braudice Byron LeMay
By: Edward C. Gritzbaugh
Atty.

Patented Apr. 11, 1950

2,503,497

UNITED STATES PATENT OFFICE 2,503,497

TRANSMISSION

Braudice Byron Le May, Muncie, Ind., assignor to Borg-Warner Corporation, Chicago, Ill., a corporation of Illinois Application July 18, 1947, Serial No. 761,875

11 Claims. (Cl. 74—759)

This invention relates to variable speed transmissions, and particularly to such transmissions employing planetary gearing.

The principal object of this invention is to provide a planetary transmission capable of producing three forward speeds, each of which speeds is made effective by the successive operation of a plurality of coupling elements, each element controlling one or more speeds.

Another object of this invention is to provide a planetary transmission capable of producing a plurality of speed ratios corresponding to first, second and direct speeds in an ordinary standard three-speed transmission of the countershaft type and wherein a plurality of coupling elements, utilized to effect the speed ratios, may be easily manipulated, if desired, by conventional shifting and selecting mechanism including a lever movable in an H-path by the operator.

A further object of this invention is to provide a planetary transmission comprising complex planetary gearing controllable for effecting at least three forward variable speed drives and reverse drive by a plurality of coupling elements, each of which is effective to establish two of said drives.

Another object of this invention is to provide an improved transmission employing complex planetary gearing and wherein a blocker-type synchronizer is used for both the clutching and braking means controlling the planetary mechanism for establishing the speed ratios above low speed ratio.

Another object of this invention is to provide an improved planetary transmission which is simple in construction, economically manufactured, compact in assembly and durable and efficient in use.

These and other advantages of this invention will become apparent from the following description when taken together with the accompanying drawing in which:

Fig. 1 is a longitudinal sectional view of a transmission embodying the principles of my invention.

Fig. 2 is a diagrammatic illustration of the transmission shown in Fig. 1.

The drawing is to be understood as being more or less of a schematic character for the purpose of disclosing a typical or preferred embodiment of the improvements contemplated herein, and in the drawing like reference characters identify the same parts wherever these parts appear in the different views.

Referring to the drawing, the transmission illustrated with reference to its mechanical structure in Fig. 1 and diagrammatically in Fig. 2, comprises a drive shaft 10 having suitable operative connection with a motor or engine (not shown), and a driven shaft 11 disposed in axial alignment with the drive shaft 10. The drive shaft 10 is provided with a reduced end 12 supported by pilot bearings 13 in a recess in the front end of the driven shaft 11. The shafts 10 and 11 are rotatably mounted within a stationary housing 14 having openings in its end walls to receive ball bearing assemblies 15 and 16 for respectively journalling the adjacent portions of the shafts.

The change speed mechanism of the transmission comprises three planetary sets generally designated 17, 18 and 19; and a plurality of controls for the sets comprising a coupling device in the form of a brake 20 cooperating with the planetary gear sets 17 and 18 to provide low speed ratio and reverse drive, respectively, as will be described hereinafter; a coupling or brake device 21; and a positive clutch device 22 of the blocker synchronizer type associated with the planetary gear sets 18 and 19, said devices including a common toothed shift collar 64 adapted to cooperate with a toothed element 77 of the brake 21 to provide second or intermediate speed ratio, or to cooperate with a toothed element of the clutch device 22 to control the set 19 to establish third or high speed ratio as will be described as the description proceeds.

Referring to the drawing for a more detailed description of the planetary gear sets and controls therefor, the planetary gear set 17 comprises a ring gear 23, a sun gear 24 preferably formed integrally with the drive shaft 10, a plurality of planet gears 25 mounted on a planet carrier 26 and meshing with ring gear 23 and sun gear 24, the planet carrier 26 being rotatably mounted on drive shaft 10 and adapted to rotate thereon.

The planetary gear set 18 is comprised of a ring gear 27, and a plurality of planet gears 28 meshing with ring gear 27 and with a sun gear 29, the planet gears 28 being mounted on a planet carrier 30. Sun gear 29 is formed on a flange portion 31 of the drive shaft 10 and, accordingly, rotates with shaft 10. Carrier 30 in the form chosen for illustration is connected to ring gear 23 of the planetary gear set 17 and comprises a portion of an annular bell-shaped casting 32 having connected thereto an element of the positive clutch 22 so that the clutch element, the ring gear 23, planet carrier 30 and casting 32 rotate as a unit. The ring gear 27 is connected to a hollow annular drum-like casting 33 having its end, remote from the ring gear, provided with angularly offset portions 34 and 35, the portion 34 being fixed by a weld 36 to a collar 37 rotatably mounted in a ring 38 formed integral with a relatively wide web 39 fixed to the outer shell of housing 14 and the portion 35 having bearing engagement with a washer 41 and cooperating with a snap ring 42 in the collar 37 to prevent axial movement of the casting 33. It may be noted that the portion 34 is provided with teeth 43 forming a part of the brake device 20.

The planetary gear set 19 comprises a ring gear 44, a sun gear 45 and planet gears 46 in mesh with the ring and sun gears and mounted on a carrier 47. The planet carrier 47 comprises a flange 48 extending radially from and formed integral with the driven shaft 11 and formed to provide spaced walls 49 and 50; an annular disc or plate 51 secured to the bell casting 32, forming a portion of the carrier 30, and retained against axial movement by a snap ring 52; and a plurality of stub shafts 53 extending through aligned openings in the walls 49 and 50 of the flange 48 and fixed in the wall 50 by pins, as shown, for rotatably mounting the planet gears 46. The inner periphery of the disc 51 has welded thereto a clutch member 54 forming a part of the clutch device 22. It will be noted that the ring gear 23 of the planetary gear set 17; the carrier 30 of the planetary gear set 18 comprising the casting 32; the carrier 47 of the planetary gear set 19 comprising the flange 48 of the driven shaft 11 and the disc 51; and the clutch member 54 of the clutch device 22, will rotate together as a unit. The ring gear 44 is fixed to the flange portion 31 of the drive shaft 10 by a bolt 55 whereby the drive shaft 10, sun gear 24 of the planetary gear set 18 and the ring gear 44 will rotate together. The sun gear 45 is formed integral with a sleeve 56 rotatably mounted on the driven shaft 11.

Referring to the brake and clutch devices of the transmission for controlling the planetary gear sets to effect the various forward speed ratios and reverse drive, the brake device 20 comprises an annular element 57 having a flange at one end thereof secured to the transmission casing 14 by a bolt 58 and an opening receiving a shifter member 59 extending within a groove in a sleeve 60 splined to the element 57 for axial shifting movement by the shifter member 59. The sleeve 60 is provided with teeth 61 selectively engageable with the teeth 43 on the casting 33 connected to the ring gear 27 of the planetary gear set 18 to hold the ring gear 27 stationary to effect low speed ratio or with teeth 62 formed on the planet carrier 26 of the planetary gear set 17 to hold the carrier 26 stationary to obtain reverse drive.

Referring to the brake and positive clutch devices 21 and 22, these devices comprise a flanged hub 63 splined and anchored by means of snap rings to the sleeve 56 of sun gear 45. A shift collar 64 is slidably mounted for movement in transverse directions parallel to the axis of the driven shaft 11 and bodily with respect to the flanged hub 63. In order to permit this bodily sliding movement, the shift collar 64 has internal teeth or splines 65 that engage external teeth or splines 66 on the flange 67 of hub 63.

Blocker type synchronizers are employed with the clutch and brake devices 21 and 22. These synchronizers comprise blocker rings 68 and 69 on opposite sides of the hub 63 and the blocker ring 68 is provided with a tapered bore receiving a correspondingly tapered synchronizer cone 70 on the clutch member 54 with which it is adapted to frictionally engage to synchronize the speeds of the clutch member 54 and collar 64 whenever the shift collar 64 is moved to the left in Figs. 1 and 2. The synchronizer cone 70 and clutch member 54 have teeth 71 and 72, respectively, which are adapted to be aligned and engage the teeth 65 on the clutch collar after synchronization of the speeds of the clutch member 54 and hub 63 has occurred. The blocker ring 69 is provided with a tapered bore for reception of a correspondingly tapered synchronizer cone 73 formed on a brake element 74 secured to the casing 14 by a bolt 75. The blocker ring 69 is adapted to be frictionally engaged with the brake element 74 to slow down and stop the rotating hub 63 and clutch collar 64 when the clutch collar is moved to the right in Figs. 1 and 2 for engagement of its teeth 65 with the teeth 76 on the ring 69 and the teeth 77 on the brake element 74. A strut element 78, of a wide or flattened U-shape, is carried by the hub flange 67 and has an offset or hump 79 intermediate its ends that is adapted to enter a shallow depression 80 on the inner surface of the shift collar 64 and acts to normally bias one or the other of the blocker rings to engaged position on their respective cones when the collar is moved from neutral position.

In the operation of the transmission and considering the driving shaft 10 to be rotating in a clockwise direction when viewed from the left of the figures, first or low speed ratio is established by moving the shift member and thereby the sleeve 60 to the left to cause the teeth 61 of the sleeve 60 to mesh with the teeth 43 on the casting 33 connected to the ring gear 27 of the second planetary gear set 18 whereby the ring gear 27 will be held against rotation to provide the necessary reaction for obtaining low speed drive. The drive will be from shaft 10 through the sun gear 29, planet gear 28, planet carrier 30 comprising the casting 32, and planet carrier 47 to the driven shaft 11.

To obtain second or intermediate speed ratio, the sleeve 60 is in neutral position and collar 64 is moved to the right to lock the sun gear 45 to the brake element 74 to maintain sun gear 45 against rotation to provide the reaction for second speed drive. The drive will be from shaft 10 through the ring gear 44, planet gear 46 and carrier 47 to the driven shaft 11.

To obtain third or high speed ratio, the collar 64 is moved to the left to lock the teeth 72 on carrier 47 to the hub 63 to thereby connect sun gear 45 and carrier 47 which prevents relative rotation of the sun gear 45, planet gear 46 and ring gear 44 of the planetary gear set 19 causing the gear set 19 to rotate as a unit with shaft 11. The driven shaft 11 is thus directly connected to driving shaft 10.

Reverse drive is established by moving the sleeve 60 of the brake device 20 to the right to connect the teeth 61 of the sleeve with the teeth 62 on the carrier 26 of the planetary gear set 17 to hold the carrier 26 against rotation. With the carrier 26 held stationary, drive will be impressed on sun gear 24 through drive shaft 10 and, since the drive is in a forward direction in sun gear 24, ring gear 23 will be rotated reversely. As the ring gear 23 is connected to carrier 30 which in turn is connected to carrier 47 rotatable with driven shaft 11, the reverse rotation in ring gear 23 will be transmitted directly to driven shaft 11.

It will be noted that sleeve 60 of brake device 20 is axially shiftable to selectively establish low speed ratio or reverse drive from an intermediate neutral position and also that the collar 64 of the brake and clutch devices 21 and 22 is axially shiftable to selectively establish second or intermediate speed ratio or high speed ratio from an intermediate neutral position. It will therefore be apparent that the sleeve 60 and clutch 64 may be operatively connected to conventional selecting and shifting mechanism, including a lever movable in the standard H-path by the operator, used with the ordinary three-speed transmission of the countershaft type.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. A variable speed transmission comprising driving and driven elements, and first and second planetary gear sets for transmitting the drive from the driving element to the driven element, each set comprising ring, planet and sun gears and a carrier for said planet gears, the sun gear of the first set and the ring gear of the second set being connected to the driving element, and the planet gear carriers of the first and second sets being connected together and to the driven element, releasable means for holding the ring gear of the first set against rotation, releasable means for holding the sun gear of the second set against rotation, and releasable means for connecting the sun gear of the second set to the carriers of the first and second sets.

2. A variable speed transmission comprising driving and driven elements, and first and second planetary gear sets for transmitting the drive from the driving element to the driven element, each set comprising ring, planet and sun gears and a carrier for said planet gears, the sun gear of the first set and the ring gear of the second set being connected to the driving element, and the planet gear carriers of the first and second sets being connected together and to the driven element, releasable means for holding the sun gear of the second set against rotation, and releasable means for connecting the sun gear of the second set to the planet gear carriers of the first and second sets.

3. A variable speed transmission comprising driving and driven elements, and first and second planetary gear sets for transmitting the drive from the driving element to the driven element, each set comprising ring, planet and sun gears and a carrier for said planet gears, the sun gear of the first set and the ring gear of the second set being connected to the driving element, and the planet gear carriers of the first and second sets being connected together and to the driven element, releasable means for holding the ring gear of the first set against rotation, and releasable means for connecting the sun gear of the second set to the planet gear carriers of the first and second sets.

4. A variable speed transmission comprising an input member, an output member, and first and second planetary gear sets for transmitting drive from the input member to the output member, each set comprising ring, sun and planet gears and a carrier for said planet gears, the sun gear of the first set being connected to the input member and the planet gear carrier of the second set being connected to the output member, releasable means for holding the ring gear of the first set against rotation to establish a first or low speed gear train between said members, releasable means for holding the sun gear of the second set against rotation while the ring gear of the first set is released to establish a second or intermediate speed gear train between said members, and releasable means for connecting the planet gear carrier and the sun gear of the second set together while the latter gear is released to establish a high speed gear train between said members.

5. A variable speed transmission comprising driving and driven elements and adapted to establish first, second and third speed ratios between said elements, said transmission comprising first and second planetary gear sets each set comprising ring, planet and sun gears and a carrier for said planet gears, the sun gear of the first set and the ring gear of the second set being connected to the driving element, and the planet gear carriers of the first and second sets being connected together and to the driven element, releasable means for holding the ring gear of the first set against rotation to establish the first speed ratio through the transmission, releasable means for holding the sun gear of the second set against rotation while the ring gear of the first set is released to establish the second speed ratio, and releasable means for holding two gears of one set against rotation relative to each other while the ring gear of the first set and the sun gear of the second set are released to establish the third speed ratio through the transmission.

6. A variable speed transmission comprising driving and driven elements and adapted to establish first, second and third speed ratios and reverse drive between said elements, said transmission comprising first, second and third planetary gear sets each set comprising ring, planet and sun gears and a carrier for said planet gears, the sun gear of the first set and the ring gear of the second set being connected to the driving element, and the planet gear carrier of the first and second sets and the ring gear of the third set being connected together and to the driven element, releasable means for holding the ring gear of the first set against rotation to establish the first speed ratio through the transmission, releasable means for holding the sun gear of the second set against rotation while the ring gear of the first set is released to establish the second speed ratio, releasable means for holding two gears of one set against rotation relative to each other while the ring gear of the first set and the sun gear of the second set are released to establish the third speed ratio through the transmission, and releasable means for holding the planet gear carrier of the third set against rotation while the gears of the other sets are released to establish reverse drive through the transmission.

7. A variable speed transmission comprising driving and driven elements, and first, second and third planetary gear sets for transmitting the drive from the driving element to the driven element, each set comprising ring, planet and sun gears and a carrier for said planet gears, the sun gear of the first set and the ring gear of the second set being connected to the driving element, and the planet gear carriers of the first and second sets being connected together and to the driven element, releasable means for holding the ring gear of the first set against rotation, releasable means for holding the sun gear of the second set against rotation, releasable means for connecting the sun gear of the second set to the planet gear carriers of the first and second sets, and releasable means for holding the planet gear carriers of the third set against rotation.

8. A variable speed transmission comprising, in combination, a drive shaft, a driven shaft, planetary gear sets connectible between said shafts, one of said sets including a ring gear fixed to said drive shaft, a sun gear having a sleeve portion rotatable on and supported by said driven shaft, planet gears meshing with said sun and ring gears, and a planet gear carrier fixed to said driven shaft, the other of said sets including a reaction element adapted to establish a drive between said shafts and held against rotation, releasable means for holding said element against rotation, a toothed brake element surrounding one end of the sleeve of the sun gear and being fixed against axial and rotational movement, a toothed clutch element secured to said carrier, an axially shiftable toothed clutch sleeve between said brake and clutch elements and carried by the sleeve of said sun gear and rotatable therewith, said clutch sleeve being selectively engageable with the teeth on said clutch element or with the teeth on said brake element to establish either a direct drive between said shafts or a drive between said shafts different from that of said first-mentioned drive and direct drive.

9. A variable speed transmission comprising, in combination, a drive shaft, a driven shaft, planetary gear sets connectible between said shafts, one of said sets including a ring gear fixed to said drive shaft, a sun gear having a sleeve portion rotatable on and supported by said driven shaft, planet gears meshing with said sun and ring gears, and a planet gear carrier fixed to said driven shaft, the other of said sets including a reaction element adapted to establish a drive between said shafts and held against rotation, releasable means for holding said element against rotation, a toothed brake element surrounding one end of the sleeve of the sun gear and being fixed against axial and rotational movement, a toothed clutch element secured to said carrier, an axially shiftable toothed clutch sleeve between said brake and clutch elements and carried by the sleeve of said sun gear and rotatable therewith, said clutch sleeve being selectively engageable with the teeth on said clutch element or with the teeth on said brake element to establish either a direct drive between said shafts or a drive between said shafts different from that of said first-mentioned drive and direct drive, and blocker type synchronizers interposed on either side of said clutch sleeve to prevent shifting movement into engagement with the teeth on said brake element or the teeth on said clutch element until the speed of rotation of their teeth are substantially synchronized.

10. A transmission comprising, in combination, a drive shaft, a driven shaft; first and second planetary gear sets for transmitting variable speed forward drives from the drive shaft to the driven shaft, and a third planetary gear set for establishing a reaction to the rotation of one of said gear sets to provide reverse drive, each of said gear sets comprising ring, sun and planet gears and a carrier for said planet gears; the sun gears of said first and third sets being fixed to said drive shaft; the ring gear of the third set and the planet carriers of the first and second sets being connected together and to said driven shaft; and the ring gear of the second set being connected to the sun gear of the first set; releasable means for holding the ring gear of the first set against rotation to establish a low speed ratio between said shafts; releasable means for holding the sun gear of the second set against rotation while the ring gear of the first set is released to establish an intermediate speed ratio between said shafts; releasable means for connecting the sun gear and the planet carrier of the second set while the ring gear of the first set and the sun gear of the second set are released to establish a third speed ratio or direct drive between said shafts; and releasable means for holding the carrier of the third set against rotation while the gears are free to rotate relative to each other to establish reverse drive.

11. A variable speed transmission comprising driving and driven elements, three planetary gear sets adapted to establish a plurality of speed ratios between said elements, each of said sets including a sun gear, a ring gear, planet gears meshing with said sun and ring gears, and a planet carrier, one gear of each of two of said sets being fixed to one of said elements and a sun gear of the third set being rotatable relative to said elements, releasable means for holding said rotatable sun gear and the other gears of the same set against relative rotation for driving said driven element from said driving element at a certain speed, releasable means for holding said rotatable sun gear against rotation to drive said driven element from said driving element at another speed, and releasable means for holding the ring gear of one of said two sets against rotation to drive said driven element from said driving element at another speed.

BRAUDICE BYRON LE MAY.

REFERENCES CITED

The following references are of record in the file of this patent:

UNITED STATES PATENTS

| Number | Name | Date |
| --- | --- | --- |
| 658,620 | Clarke et al. | Sept. 25, 1900 |
| 662,306 | Riker | Nov. 20, 1900 |
| 723,758 | Symmonds | Mar. 24, 1903 |
| 992,321 | Wise | May 16, 1911 |
| 1,404,675 | Wilson | Jan. 24, 1922 |
| 2,127,655 | Stromquist | Aug. 23, 1938 |
| 2,164,729 | Wilson | July 4, 1939 |
| 2,177,951 | Simpson | Oct. 31, 1939 |
| 2,324,713 | McFarland | July 20, 1943 |
| 2,399,657 | Banker | May 7, 1946 |

FOREIGN PATENTS

| Number | Country | Date |
| --- | --- | --- |
| 355,895 | Great Britain | Sept. 3, 1931 |
| 367,079 | Great Britain | Feb. 18, 1932 |
| 368,544 | France | Oct. 10, 1906 |